(12) United States Patent
Liebel et al.

(10) Patent No.: US 9,908,168 B2
(45) Date of Patent: Mar. 6, 2018

(54) METHOD AND DEVICE TO PRODUCE A SHAPED SHEET METAL PART

(71) Applicant: SCHULER AUTOMATION GMBH & CO. KG, Hessdorf (DE)

(72) Inventors: Martin Liebel, Alfeld (DE); Thomas Pohl, Grossenseebach (DE)

(73) Assignee: SCHULER AUTOMATION GMBH & CO. KG, Hessdorf (DE)

( * ) Notice: Subject to any disclaimer, the term of this patent is extended or adjusted under 35 U.S.C. 154(b) by 0 days.

(21) Appl. No.: 14/897,512

(22) PCT Filed: May 5, 2014

(86) PCT No.: PCT/EP2014/059111
§ 371 (c)(1),
(2) Date: Dec. 10, 2015

(87) PCT Pub. No.: WO2014/198458
PCT Pub. Date: Dec. 18, 2014

(65) Prior Publication Data
US 2016/0136715 A1 May 19, 2016

(30) Foreign Application Priority Data

Jun. 11, 2013 (DE) .................... 10 2013 210 878

(51) Int. Cl.
*B21D 35/00* (2006.01)
*B21D 43/02* (2006.01)
(Continued)

(52) U.S. Cl.
CPC ........... *B21D 35/001* (2013.01); *B21D 35/00* (2013.01); *B23K 26/0846* (2013.01); *B23K 26/38* (2013.01); *B23K 2201/16* (2013.01)

(58) Field of Classification Search
CPC .... B21D 43/003; B21D 43/026; B21D 43/05; B21D 43/287; B21D 35/001
See application file for complete search history.

(56) References Cited

U.S. PATENT DOCUMENTS

| 4,859,828 A | 8/1989 | Zumstein |
| 2006/0118529 A1 | 6/2006 | Aoki et al. |

(Continued)

FOREIGN PATENT DOCUMENTS

| EP | 0 646 428 A1 | 4/1995 |
| EP | 2 420 344 A1 | 2/2012 |

OTHER PUBLICATIONS

PCT, "International Search Report for International Application No. PCT/EP2014/059111".

(Continued)

*Primary Examiner* — Debra Sullivan
(74) *Attorney, Agent, or Firm* — Manabu Kanesaka

(57) ABSTRACT

The invention relates to a method for producing a shaped sheet metal part including the following steps, continuous feeding of a sheet metal band unwound from a coil to a jet cutter, concurrent cutting, by means of the jet cutter, of a blank out of the sheet metal band as it moves at a constant speed, the time required to produce the blank defining a cycle, picking up the blank by means of a first transfer device operating in time with the cycle, transferring the blank by means of a first transfer device to a shaping system operating in time with the cycle, and shaping the blank into a shaped sheet metal part by means of the shaping system.

18 Claims, 10 Drawing Sheets

(51) Int. Cl.
 *B23K 26/08* (2014.01)
 *B23K 26/38* (2014.01)
 *B23K 101/16* (2006.01)

(56) References Cited

U.S. PATENT DOCUMENTS

2009/0212033 A1* 8/2009 Beck .................. B23K 26/0846
 219/121.72
2010/0122970 A1 5/2010 Caristan
2011/0283851 A1* 11/2011 Overrath ................ B21D 22/00
 83/15

OTHER PUBLICATIONS

PCT/IPEA/409, "International Preliminary Report on Patentability for International Application No. PCT/EP2014/059111."

* cited by examiner

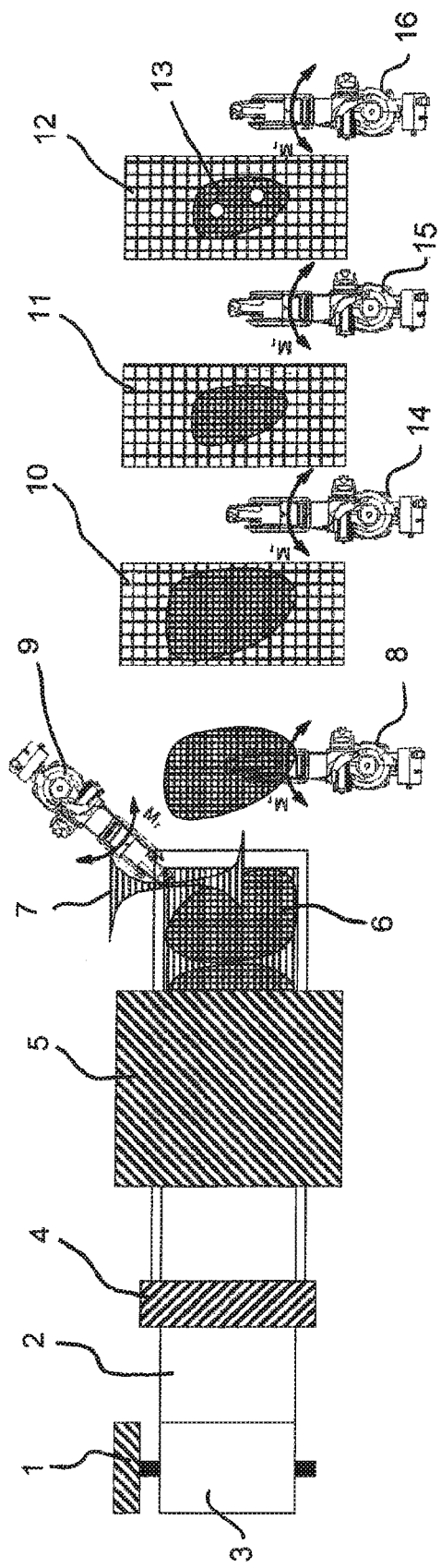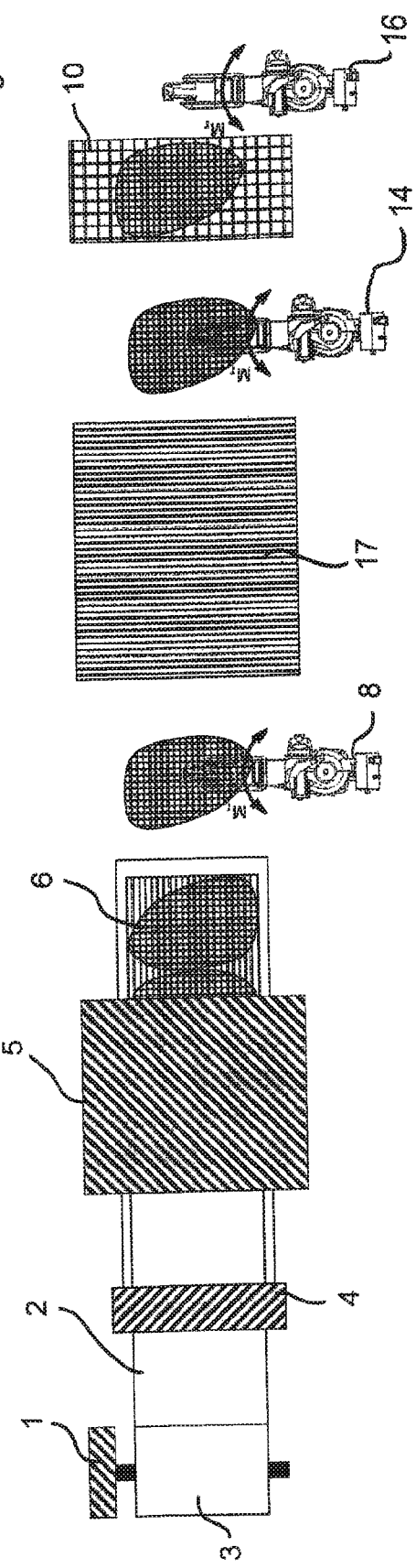

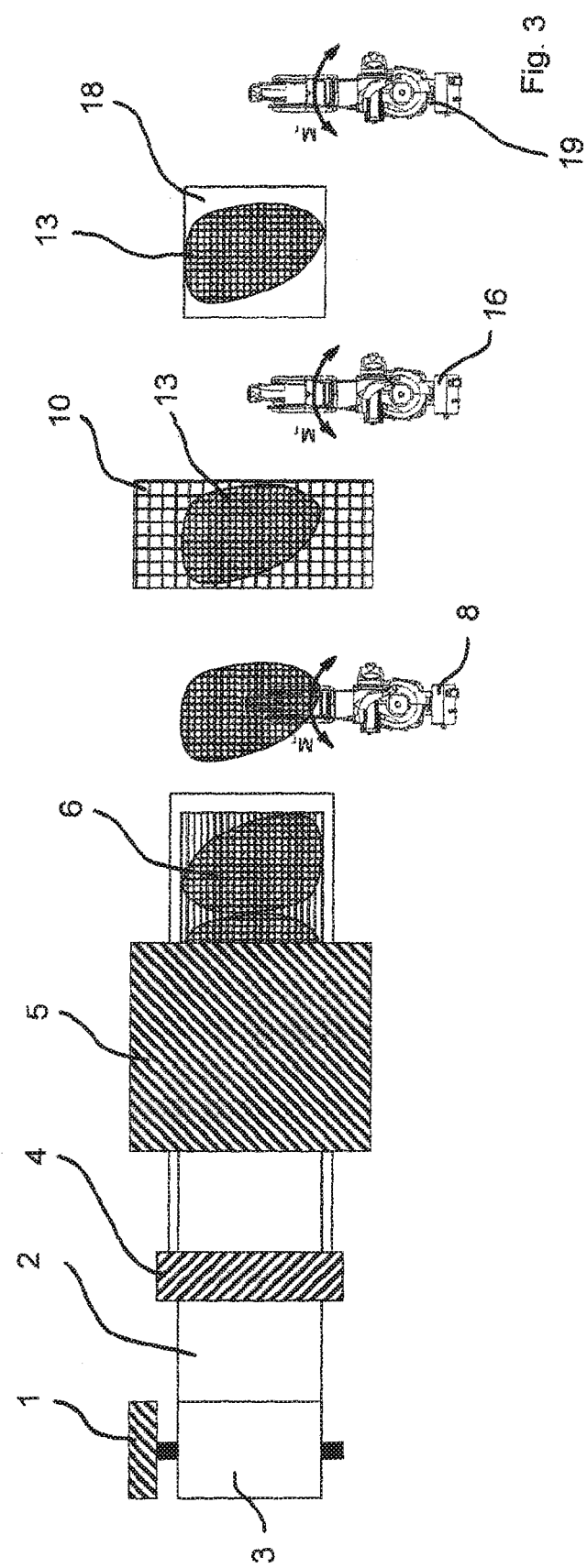

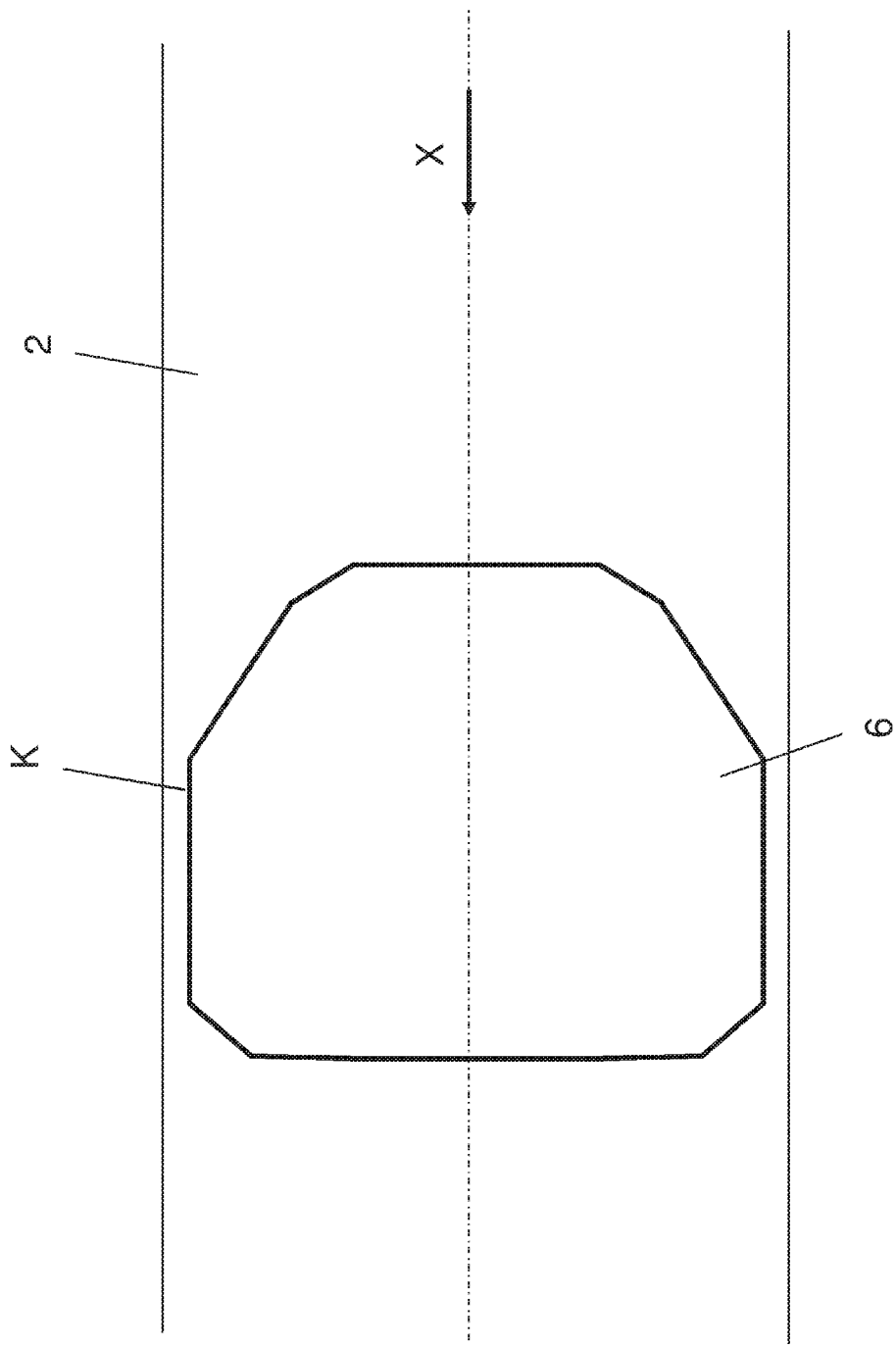

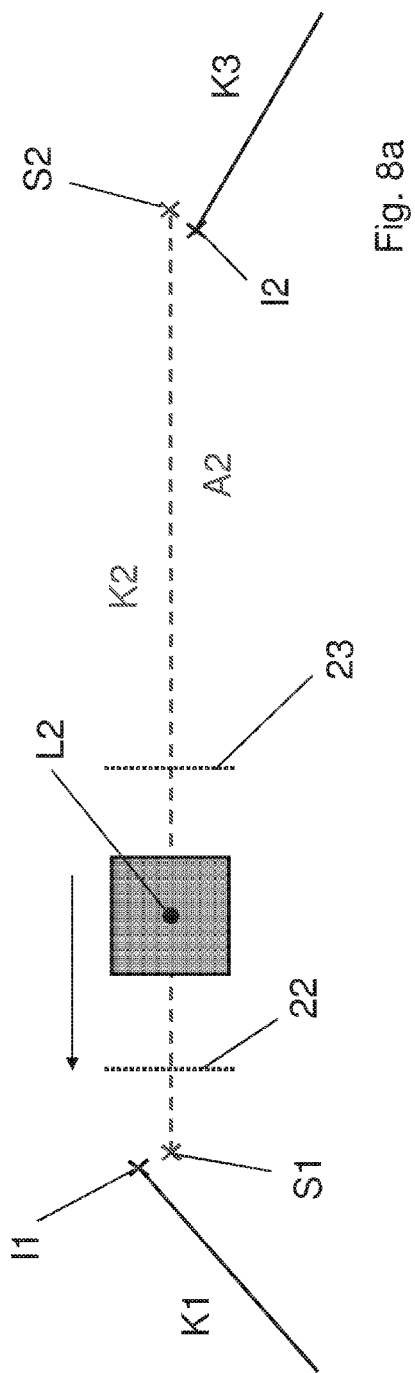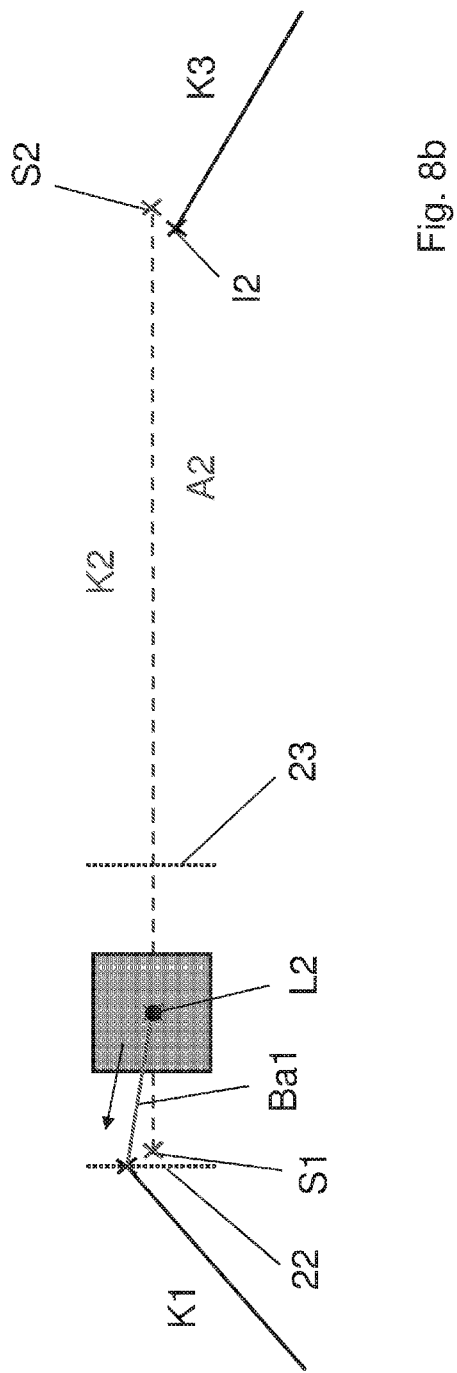

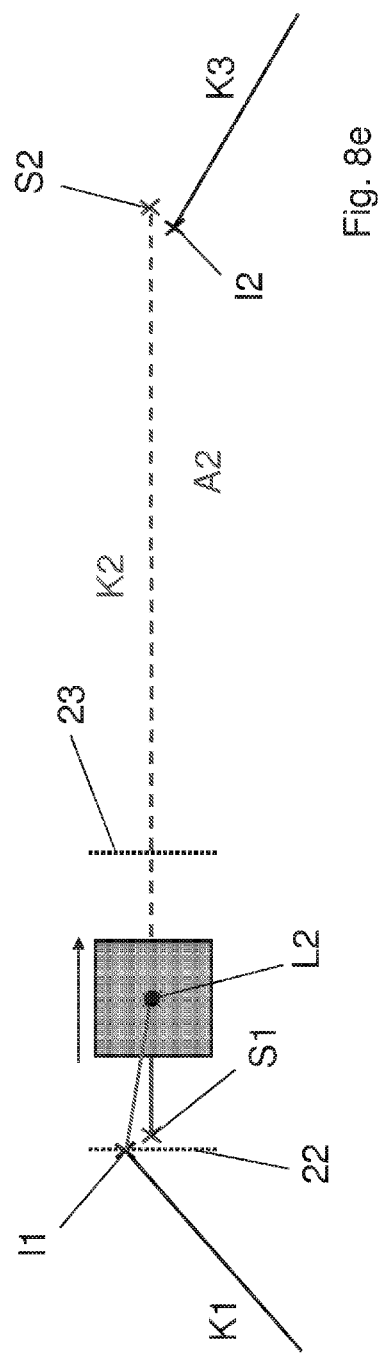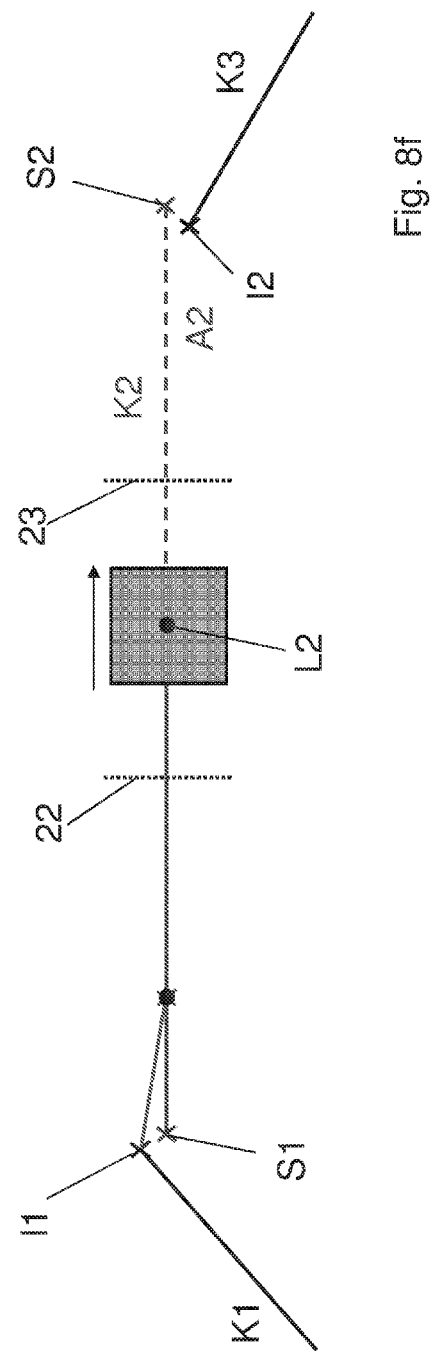

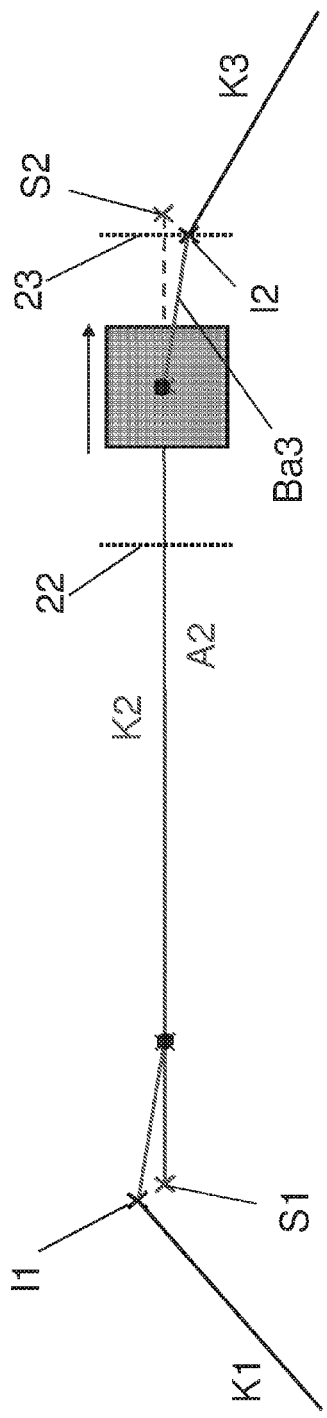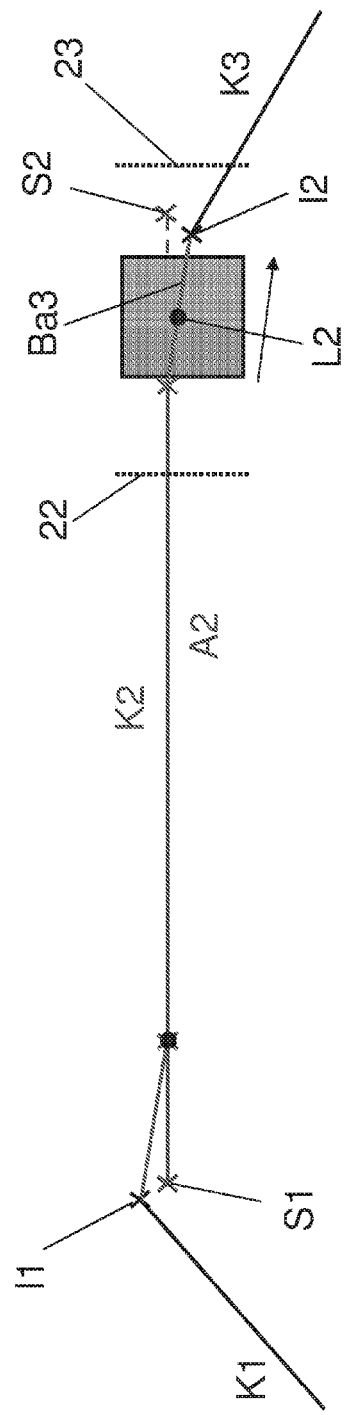

METHOD AND DEVICE TO PRODUCE A SHAPED SHEET METAL PART

RELATED APPLICATIONS

The present application is National Phase of International Application No. PCT/EP2014/059111 filed May 5, 2014, and claims priority from German Patent Application No. DE 10 2013 210 878.8, filed Jun. 11, 2013, the disclosure of which is hereby incorporated by reference herein in its entirety.

BACKGROUND OF THE INVENTION

The invention relates to a method and a device to produce a shaped sheet metal part, for example a motor vehicle body part.

The prior art, for example WO 2009/105608 A1 or EP 2 420 344 A1, discloses a device for cutting blanks out of a sheet metal band that is continuously fed through a laser cutter. The cut blanks are picked up at the end of the cutting line, for example, by means of a robot, and then stacked on a cart. The cart then transports them to an intermediate storage location or to a shaping system, for example a press. The press produces shaped sheet metal parts from the blanks.

WO 2010/144517 A2 discloses a method for producing a shaped sheet metal part that involves unwinding a sheet metal band from a coil and feeding sections of it to a blanking press in cycles. The blanking press is used to cut blanks out of the sheet metal band in cycles. The blanks are picked up by means of a first transfer device operating in cycles and fed to a processing apparatus. The processing apparatus can be a press.

US 2010/0122970 A1 discloses a cutting table with a holding device to hold a section of sheet metal band that has been laid on it. The holding device is made of holding modules extending in the y-direction that have vacuum sources or magnets mounted on them. The holding modules solidly hold a section of sheet metal laid on the cutting table during the cutting process. Blanks cut out of the sheet metal band are picked up by a first transfer device and then stacked on a pallet.

The methods for producing a shaped sheet metal part using the known devices are complicated and time-consuming.

The goal of the invention is to eliminate the disadvantages of the prior art. In particular, the goal is to indicate a method and a device that can produce a shaped sheet metal part quickly and efficiently.

BRIEF SUMMARY OF THE INVENTION

This is accomplished by the features of the invention. Expedient embodiments of the invention follow from the features.

The invention proposes a method for producing a shaped sheet metal part comprising the following steps:
continuously feeding a sheet metal band unwound from a coil to a jet cutter;
moving cutting, by means of the jet cutter, of a blank out of the sheet metal band moving at a constant speed, the time required to produce the blank defining a cycle;
picking up the blank by means of a first transfer device operating in time with the cycle;
transferring the blank by means of a first transfer device to a shaping system operating in time with the cycle; and
shaping the blank into a shaped sheet metal part by means of the shaping system.

The inventive transfer, by means of the first transfer device, of the blank to a shaping system operating in time with the cycle can advantageously save the effort of stacking blanks on carts, transporting the blanks by the carts to an intermediate storage location or to a shaping system, and picking the blanks up again to put them into the shaping system. The proposed method involves producing the shaped sheet metal part in a single line starting from the continuously moving sheet metal band. In this method, the first transfer device is designed in such a way that it concurrently grasps the blank and lifts it off a conveying device, for example at least one conveyor belt, and then transfers it onto the shaping system. This can substantially shorten the time it takes to produce a shaped sheet metal part. The inventive method can also substantially reduce the logistic effort involved in producing a shaped sheet metal part.

As defined by this invention, the term "shaping system" should be understood in general terms. In addition to an actual shaping device, it can also comprise additional processing devices, for example a deburring device upstream of the shaping device, an oiling device, a cleaning device, a furnace, and/or a downstream quality monitoring device.

As defined by this invention, the "shaped sheet metal part" should be understood to mean a part that is shaped into a shaped part having three-dimensional geometry starting from a blank cut out of the sheet metal band by the jet cutter. The sheet metal can be made, for example, of steel, stainless steel, aluminum, or magnesium. The sheet metal can be painted or have corrosion protection.

According to the invention the sheet metal band is continuously fed to the jet cutter. During the cutting process, the blank is moved through the jet cutter at a constant speed. This increases the speed at which the shaped sheet metal part is produced.

According to another advantageous embodiment, a second transfer device concurrently picks up at least one scrap piece formed by cutting the blank, and sets it on a first stacking place. A scrap piece formed by cutting the blank can also be removed by means of a removal device arranged beneath a cutting plane defined by a table of the jet cutter. The removal device can be a scrap metal shaft, a conveyor belt, a rail-mounted cart, a scrap crushing device, or something similar. Instead of the previously mentioned scrap piece, it is also possible for another blank to be cut out of the sheet metal band. The other blank can have a geometry deviating from that of the first one, to improve material utilization. The other blank can be transferred to another shaping system by means of another transfer device.

The blank can be rotated and/or turned over by means of the first transfer device. In particular, it can be moved into a suitable position for putting it into the shaping system. To accomplish this, the first transfer device can have a camera. The pictures provided by it can be used, by a suitable image evaluation program, to detect the exact position of the blank held by the first transfer device with reference to the first transfer device, and thus exactly calculate a delivery position in the first shaping system.

According to another embodiment of the invention, the blank is set, by means of the first transfer device, into a shaping device of the shaping system, or onto a transfer place. From the transfer place, the blank can alternatively be transported to one of several shaping devices by means of one of several first transfer devices. The blank can also be picked up from the transfer place by means of a third transfer device working in time with the cycle and set into a shaping device of the shaping system.

Another embodiment provides that if the shaping system malfunctions the blank is set, by means of the first transfer device, onto a second stacking place. The blanks can be stacked there until the malfunction of the shaping system is remedied. In addition, if the jet cutter malfunctions, the blank can be picked up, by the first or third transfer device, from the second stacking place and transferred to the shaping system. This further increases the efficiency of the inventive method.

According to another embodiment of the invention, it is also possible for the blank to be transferred, by the first transfer device, to a transport device for transport through a furnace. The heated blank can be picked up downstream of the furnace by means of a fourth transfer device working in time with the cycle and set into a shaping device of the shaping system. Thus, the inventive method is also suitable for producing shaped sheet metal parts by means of hot shaping.

A blank geometry specified by a cutting program to control the jet cutter can be changed, depending on a deviation in an actual geometry of the shaped sheet metal part from a specified geometry. To accomplish this, the geometry of the shaped sheet metal part is captured, for example with a camera, after it is for produced. If the shaped sheet metal part's actual geometry should be found to deviate from a specified geometry, a suitable simulation program can then determine how this deviation can be avoided by a suitable change in the blank's geometry. Then a corresponding change can be made in the cutting program to control the cutting device. This makes it possible to produce shaped sheet metal parts with especially exact geometry. In particular, it also means that the shaped sheet metal parts do not need edge trimming, at least partially.

It is expedient for the jet cutter that is used to be a laser cutter with at least one laser cutting head that can be moved in the xy direction.

It is advantageous to cut a blank by means of different laser cutting heads making partial cuts. It is expedient for the laser cutter to comprise several laser cutting heads that can be moved in the xy direction and that expediently have a fiber laser.

To cut a blank with a specified contour out of a sheet metal band that is continuously conveyed in a transport direction, the following steps are advantageously proposed:

providing a laser cutter with two laser cutting heads, each of which can be moved both in the transport direction and also in a y direction running perpendicular to it, and a controller to control the movement of the laser cutting heads according to a control program to produce the specified contour, a first laser cutting head having a first working range and a second laser cutting head having a second working range following it, downstream in the transport direction;

making a first partial contour cut having an end point by means of a first laser beam produced by the first laser cutting head;

moving a section of the sheet metal band containing the end point into the second working range;

detecting an end section of the first partial contour cut containing the end point by means of at least one optical sensor provided on the second laser cutting head;

moving the second laser cutting head to line up with the end section on the basis of an evaluation of the measurements provided by the at least one optical sensor, and subsequently producing a second laser beam that reaches into the end section of the first partial contour cut and, starting from there, makes a second partial contour cut continuing the first partial contour cut; or moving a second laser beam produced by the second laser cutting head to make, on the basis of an evaluation of the measurements provided by the at least one optical sensor, a second partial contour cut to the end section, so that the second partial contour cut opens into the first partial contour cut.

The term "optical sensor" is generally understood to mean a sensor that can detect, in the area surrounding the laser cutting head, a cut in a piece of sheet metal, the cut being outside, preferably exclusively outside, a current cutting area of the laser cutting head. The measurements provided by the optical sensor are evaluated by the controller. A movement is calculated to line the laser cutting head up with the end section and make a laser beam produced by the laser cutting head reach into the end section.

With the method it is possible to cut, out of a continuously moving sheet metal band, blanks that match very exactly with a specified contour. In particular, the contour has the specified shape even in a transitional area where a second partial contour cut meets a first partial contour cut. It is unnecessary to post-process such a transitional area after the blank is cut out of the sheet metal band. This saves effort and costs.

It is expedient for an observation area facing the sheet metal band in the area surrounding the second laser cutting head to be illuminated with at least one non-coherent light source. It can be observed whether the second laser beam reaches exactly into the end section of the first partial contour cut. If necessary, the cutting movement of the second laser beam can be immediately corrected, so that the second laser beam reaches into the end section. The use of a non-coherent light source also allows the observation area to be observed during the cutting opera-tion, if a suitable optical filter is used.

According to an advantageous embodiment of the invention, the second laser cutting head has two optical sensors on it that are arranged opposite one another. This makes it possible to observe an area that is ahead of a cut made by the second laser beam, in the direction of the cut, irrespective of the respective direction in which the second laser cutting head is moving. It is expedient for each of these optical sensors arranged opposite one another to have an observation area of 180°.

According to another advantageous embodiment, it is also possible to observe an area surrounding the second laser cutting head with several optical sensors having partially overlapping observation areas. For example, to observe the area surrounding the second laser cutting head, it is possible to provide three or four optical sensors that are mounted on the second laser cutting head in such a way that the entire area surrounding the sheet metal band located opposite the second laser cutting head can be observed with them.

The optical sensor can also comprise a light section sensor. A light section sensor or a laser triangulation sensor makes it possible to determine a height profile along a line. The height profile makes it possible to recognize a cut made in the sheet metal band. A light section sensor comprises a line projector that has a laser as its light source. The line projector projects a narrow, bright line on the sheet metal band. The line projector also comprises a position sensitive device, a CCD line or a CCD camera, with which the projection of the line on the sheet metal band is observed.

From the displacement of the observed line it is possible to derive a height profile and thus recognize a cut in the sheet metal band.

The optical sensor can also be a camera, preferably a CCD camera, such as is commonly used in many devices, for example smartphone cameras or similar devices.

According to an especially advantageous embodiment of the invention, as the sheet metal band moves in the transport direction, a deviation in the position of the sheet metal band in the y direction is continually detected and from it a corrected y position is calculated for the second working range. To measure how much the position of the sheet metal band deviates in the y direction from an expected position, it is possible to provide, for example, a band edge detector or a sensor to detect a band middle position. Such sensors are commonly available. If the sheet metal band deviates in the y direction from the expected position, an appropriate correction can be continually made in the cutting program to make the first partial contour cut. Consequently, it can be that a y position of an end point of the first partial contour cut made in the first working range deviates from its expected y position specified by the cutting program. The proposed detection of the deviation in the position of the sheet metal band in the y direction makes it possible to calculate the movement of the second laser cutting head to the end section on the basis of a corrected y position. This makes the proposed method robust and unsusceptible to faults.

According to another advantageous embodiment, the second laser cutting head is moved in the direction of the y position or the corrected y position before the end point enters the second working range. Consequently, when the end point enters the second working range the second laser cutting head is already located near it. This can also gain time to detect the end section and move the second laser cutting head to the end section. This makes it possible to carry out the method even when the sheet metal band is being transported at relatively high speeds in the transport direction.

It is expedient to use robots, preferably 5- or 6-axis robots, as transfer device(s). Robots allow the blanks to be concurrently picked up and transferred in time with a specified cycle. This also allows the blanks to be rotated and/or turned over in accordance with a specified program control and put into any suitable position, so that they can be exactly put into the die of a shaping device.

It is possible to use at least one press, at least one hot shaping press, or a hydroforming device as a shaping device. The shaping device can also be a press working line shaped of several presses one after the other.

The invention also proposes a device to produce a shaped sheet metal part comprising:

a feeding device to feed a sheet metal band unwound from a coil to a jet cutter;

a jet cutter to cut a blank out of the sheet metal band, the time required to produce the blank defining a cycle;

a first transfer device working in time with the cycle to pick up the blank and transfer it to a shaping system working in time with the cycle; and a shaping system working in time with the cycle to shape the blank into the shaped sheet metal part.

The inventive device involves the jet cutter, the first transfer device, and the shaping system operating in time with the same cycle. To accomplish this, a controller is provided that controls the feeding device, the jet cutter, the first transfer device, and the shaping system together. In particular, the controller coordinates the transport speed of the sheet metal band through the jet cutter with the transfer speed of the first transfer device. Likewise, the shaping speed of the shaping system is coordinated with the transfer speed of the first transfer device. The controller can be a process computer-aided controller with a corresponding control program.

The first transfer device is advantageously designed in such a way that it concurrently grasps the blanks as they are transported in the transport direction by means of at least of one conveyor belt, for example, and then lifts them off the conveying device. To accomplish this, the first transfer device has a grasping device, for example a robot arm, which is first accelerated to a speed corresponding to the transport speed of the blank. Then, the grasping device grasps the blank and lifts it off the conveying device. The grasping device can be a magnet grasping device or a grasping device working by means of negative pressure.

According to an advantageous embodiment of the invention, the feeding device comprises a roller straightening machine. It can straighten the sheet metal band and simultaneously feed it to the jet cutter at a specified transport speed.

According to another embodiment of the invention, the laser cutter comprises two laser cutting heads, each of which can be moved both in the transport direction and also in a y direction running perpendicular to it, and a controller to control the movement of the laser cutting heads in accordance with a control program to produce the specified contour, a first laser cutting head having a first working range and a second laser cutting head having a second working range following it, downstream in the transport direction, at least the second laser cutting head having at least one optical sensor on it, and furthermore an evaluation system being provided to evaluate the measurements provided by the at least one optical sensor, so that the second laser cutting head can be moved on the basis of the evaluation to line up with the end section.—This makes it possible to produce blanks very exactly from several partial contour cuts.

The second laser cutting head advantageously has two optical sensors on it that are arranged opposite one another. The optical sensors can have at least partly overlapping observation areas. The at least one optical sensor can comprise a camera or a light section sensor. It is expedient for the optical sensor to be designed so that only one area outside a current cutting area of the laser cutting head is observed with it. This simplifies the capture of suitable data or images pictures to determine the position of the end section.

According to another advantageous embodiment, the inventive device comprises a deviation detection device to detect a deviation in the position of the sheet metal band in the y direction and to calculate a corrected y position for the second working range. Such a deviation detection device can comprise sensors to detect an edge position of the sheet metal band with respect to the device. The proposed deviation detection device makes it possible to produce a blank with a specified contour especially quickly and exactly.

For the other features of the embodiment of the device, see the description of the preceding features of the method. The functionalities described there can be embodied by corresponding features of the device.

The invention is explained in detail below on the basis of sample embodiments. The figures are as follows:

BRIEF DESCRIPTION OF THE SEVERAL VIEWS OF THE DRAWINGS

FIG. 1 a schematic top view of a first device;

FIG. 2 a schematic top view of a second device;

FIG. 3 a schematic top view of a third device;

FIG. 4 a schematic top view of a sheet metal band with a blank to be cut out of it;

FIG. 8a-h steps to make a second partial contour cut.

DETAILED DESCRIPTION OF THE INVENTION

Figure 5:
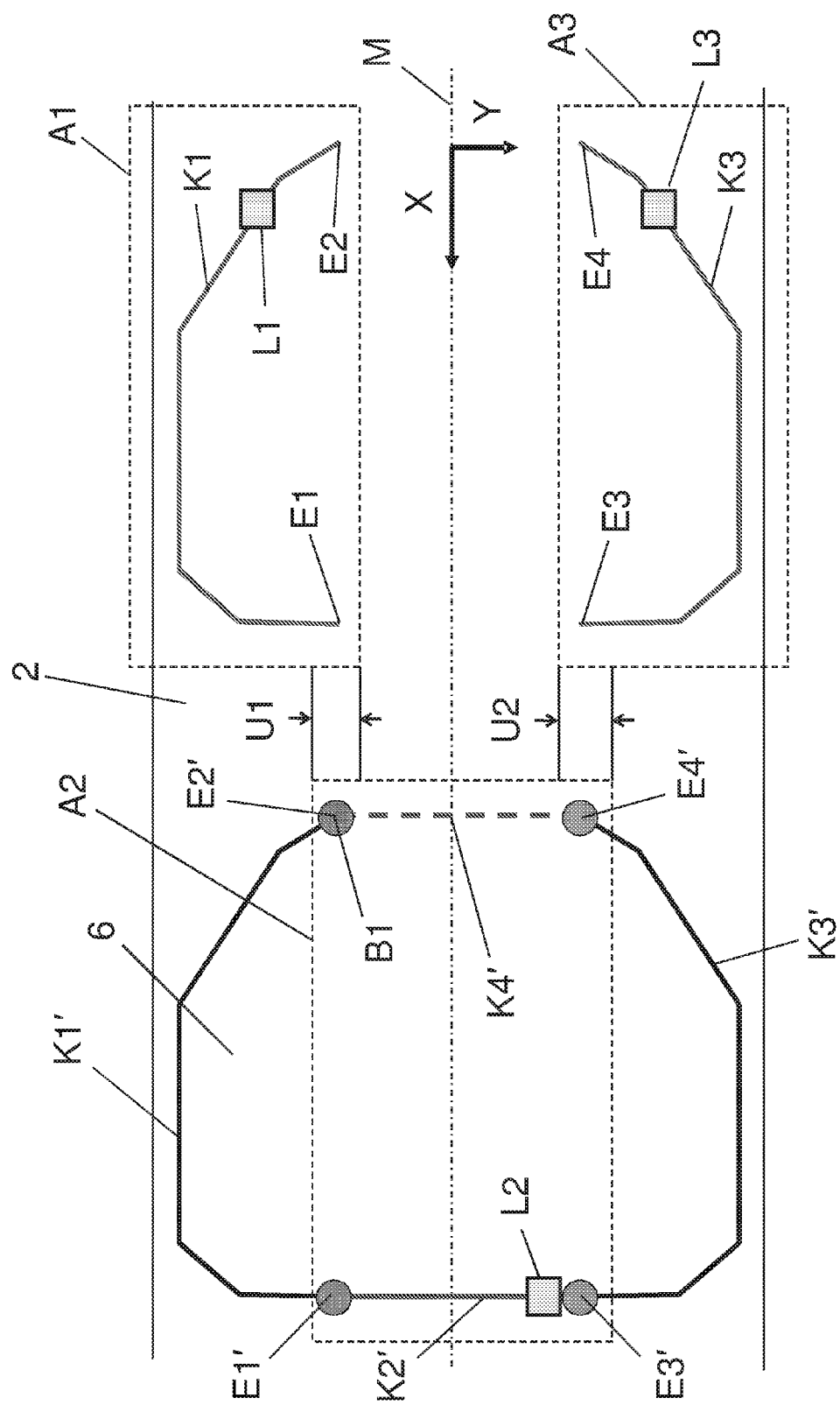
FIG. 5 a schematic top view of the sheet metal band and working ranges of laser cutting heads of a laser cutter.

FIG. 1 through 3 show a coil 3 formed of a sheet metal band 2 that is held on a reel 1. Reference number 4 designates a roller straightening machine that has a laser cutter 5 downstream of it. Reference number 6 designates a blank. A scrap piece formed when blank 6 is produced is designated with the reference number 7. FIGS. 2 and 3 omit the scrap piece for clarity.

FIG. 1 shows a first robot 8 and a second robot 9 downstream of the laser cutter 5. The first robot 8 transfers the blank 6 to a first press 10 that is provided downstream. The second robot 9 removes the scrap piece 7 to a removal device (not shown) or sets the scrap piece 7 onto a first stacking place (not shown). A second 11 and a third press 12 are provided downstream of the first press 10. A third robot 14 and a fourth robot 15 are provided to transfer the shaped sheet metal parts 13 produced with it. A fifth robot 16 transfers the shaped sheet metal part 13 to a receiving device (not shown) to receive the shaped sheet metal parts 13.

The first device operates as follows:

A sheet metal band 2 unwound from the coil 3 is continuously fed to the laser cutter 5 by the roller straightening machine 4. The laser cutter 5 can comprise several laser cutting heads that can be moved in the xy direction and that can be moved by means of a process computer-aided controller to cut out the blanks 6 with a specified geometry. The cut-out blanks 6 are picked up downstream of the laser cutter 5 by a first robot 8 and fed by it to a first press 10 that is farther downstream. The scrap pieces 7 are picked up downstream of the laser cutter 5 by a second robot 9 and set on a first stacking place, for example, from where they are subsequently removed.

A third robot 14 transfers a preform of the shaped sheet metal part 13 from the first press 10 to the second press 11. The second press 11 produces another preform of the shaped sheet metal part 13. The other preform is transferred by a fourth robot 15 to a third press 12. Finally, the third press 12 produces the shaped sheet metal part 13. The shaped sheet metal part 13 is removed by a fifth robot 16 and transferred to a receiving device (not shown). The receiving device can be a container or something similar.

It is expedient for the robots 8, 9, 14, 15, 16 have a negative pressure device, an electromagnet, or something similar to pick up the blanks 6. For exact positioning of the blanks 6 when they are transferred to the shaping system, optical sensors, for example light section sensors, cameras, or something similar can be provided. Furthermore, inductive or mechanical sensors can also be provided. To ensure exact positioning of the blank 6 in a shaping device of the shaping system, it is possible to provide stops or centering pins that engage into the blank 6.

A feed speed of the sheet metal band 2, which is generated by the roller straightening machine 4; the sequences of motions of the laser cutting heads in the laser cutter 5; and the sequences of motions of the robots 8, 9, 14, 15, 16 and the presses 10, 11, 12 are controlled by means of a controller (not shown). In particular, the controller controls the sequences of motions of the robots 8, 9, 14, 15, 16 as a function of the feed speed the sheet metal band 2. Furthermore, it also controls the sequences of motions of the presses 10, 11, 12 as a function of the speed of advancement of the sheet metal band 2. To determine the speed of advancement of the sheet metal band 2, it is expedient for a sensor to be provided. It is expedient for the sensor to be arranged between the roller straightening machine 4 and the laser cutter 5. The sensor can expediently be a length measuring system comprising, for example, a wheel that is frictionally engaged on the sheet metal band 2. From the change in the angle of the wheel it is possible to infer the travel of the sheet metal band 2. From the travel of the sheet metal band 2 it is possible to infer its speed.

A control program of the controller can comprise several safety routines. A first safety routine provides that if there is a malfunction in one of the presses 10, 11, 12 or one of the robots 14, 15, 16, the first robot 8 stacks the blanks 6 on a second stacking place (not shown), which is preferably located outside the transport path of the sheet metal band 2 or the blanks 6 produced from it.

Similarly, another safety routine can provide that if there is a failure, for example in the laser cutter 5, the first robot 8 picks up the blanks 6 from the second stacking place and feeds them, in time with the cycle, to the press working line formed by the presses 10, 11, 12 and the robots 14, 15, 16.

FIG. 2 shows a second inventive device. The blank 6 is set, by the first robot 8, on a transport device (not shown) to transport it through a furnace 17. The second robot 9 feeds the blank 6, which has been heated in the furnace 17, to the first press 10. In this case, the first press 10 is a hot shaping press.

FIG. 3 shows a top view of a third device. The blank 6 is transferred, by means of the first robot 8, to the first press 10 in time with the cycle. A shaped sheet metal part 13 produced by the first press 10 is then transferred by the fifth robot 16 to a testing device labeled with the reference number 18. The testing device 18 can be used to carry out the following method:

The testing device 18 can comprise a camera, for example. A picture of the shaped sheet metal part 13 taken with the camera can be evaluated by an image evaluation program. In particular, it can be established whether the actual geometry of the shaped sheet metal part 13 deviates from a specified geometry, and possibly to what extent it deviates.

If it does deviate, this can be computationally reversed by "reverse simulation" of the shaping process. Consequently, a deviation in the actual geometry from the specified geometry can subsequently be compensated by a change in the cutting contour of blank 6. However, the deviation can also be compensated by manually changing the cutting contour. It is also possible to provide a simple algorithm with which the cutting contour is changed as a function of the deviation to compensate it.

A change in the cutting contour can be required, for example, if there are fluctuations in the thickness of the sheet metal band 2. The proposed change in the cutting contour makes it possible to produce the shaped sheet metal parts 13 having an especially exact geometric shape. Under some circumstances, it is possible to do without the edge trimming of the shaped sheet metal parts that is required in the prior art.

FIG. 4 shows a schematic top view of a sheet metal band 2. Reference letter K designates a contour in a blank 6. Reference letter x designates a transport direction of the sheet metal band 2. For transport in the transport direction x, the sheet metal band 2 is continuously moved by means of a transport device (not shown). The transport device can be, for example, a roller straightening machine, a conveyor belt, or something similar.

FIG. 5 shows a schematic top view of the sheet metal band 2 with laser cutting heads over it that can be moved in working ranges. Reference number L1 designates a first laser cutting head that can be moved, both in transport direction x and also in a y direction running perpendicular to it, in a first working range A1. To accomplish this, the first laser cutting head L1 can be put on a first carriage (not shown), that can be concurrently moved in the transport direction x. The first carriage has a bridge spanning the width (extending in the y direction) of the first working range A1, with a second carriage (not shown), on which is mounted the first laser cutting head L1, which can be moved in the y direction.

Downstream of the first working range A1 in the transport direction x is a second working range A2 of a second laser cutting head L2. The second laser cutting head L2 can be moved freely in the x and y direction in the second working range A2. To accomplish this it can be mounted, similarly to the first laser cutting head L1, on another (not shown) first carriage, which can concurrently be moved in the transport direction x and which has a bridge spanning the second working range A2, the bridge having the second laser cutting head L2, which can be moved in the y direction on another second carriage (not shown).—The first working range A1 and the second working range A2 have a first overlap U1 in the y direction. The first working range A1 and the second working range A2 can also overlap in the x direction.

Reference letter M designates a midline of the laser cutter. The laser cutter comprises a third laser cutting head L3, whose third working range A3 is symmetric to the first working range A1 of the first laser cutting head L1 with respect to the midline M. I.e., the third working range A3 is located upstream of the second working range A2. It has, similarly to the first working range A1, an overlap U2 in the y direction with the second working range A2. The third working range A3 and the second working range A2 can also overlap in the x direction.

To produce the blank 6, the first partial contour cut K1 is produced by the first laser cutting head L1. Simultaneously, a third partial contour cut K3 can be produced by the third laser cutting head L3. The first partial contour cut K1 has a first end point E1 and a second end point E2. The third partial contour cut K3 has a third end point E3 and a fourth end point E4. The corresponding end points of a previously produced first partial contour cut K1' are labeled with E1' and E2'. The end points of a previously produced third partial contour cut K3' are labeled with E3' and E4'.

In FIG. 5, reference number K2' designates a second partial contour cut and reference number K4' designates a fourth partial contour cut, which are intended to connect the first partial contour cut K1' and the third partial contour cut K3' that have already been made. Reference number B1 designates a first transitional area, which is located in the second working range A2 and is stationary, like working ranges A1, A2, A3.

Because of the continuous movement of the sheet metal band 2 in the x direction the first partial contour cut K1 and possibly the third partial contour cut K3 are moved out of the first working range A1 and possibly out of the third working range A3, into the second working range A2. As soon as the first end E1 has entered the second working range A2, the second laser cutting head L2 is moved into the first transitional area B1. After the end section is detected by the optical sensor, the second laser cutting head L2 begins to make the second partial contour cut K2. FIG. 5 shows the situation shortly before completion of the second partial contour cut K2. Immediately after the second partial contour cut K2 is completed, the second laser cutting head L2 travels back into the first transitional area B1, to make the fourth partial contour cut K4 indicated with the dashed line.

Figure 6:
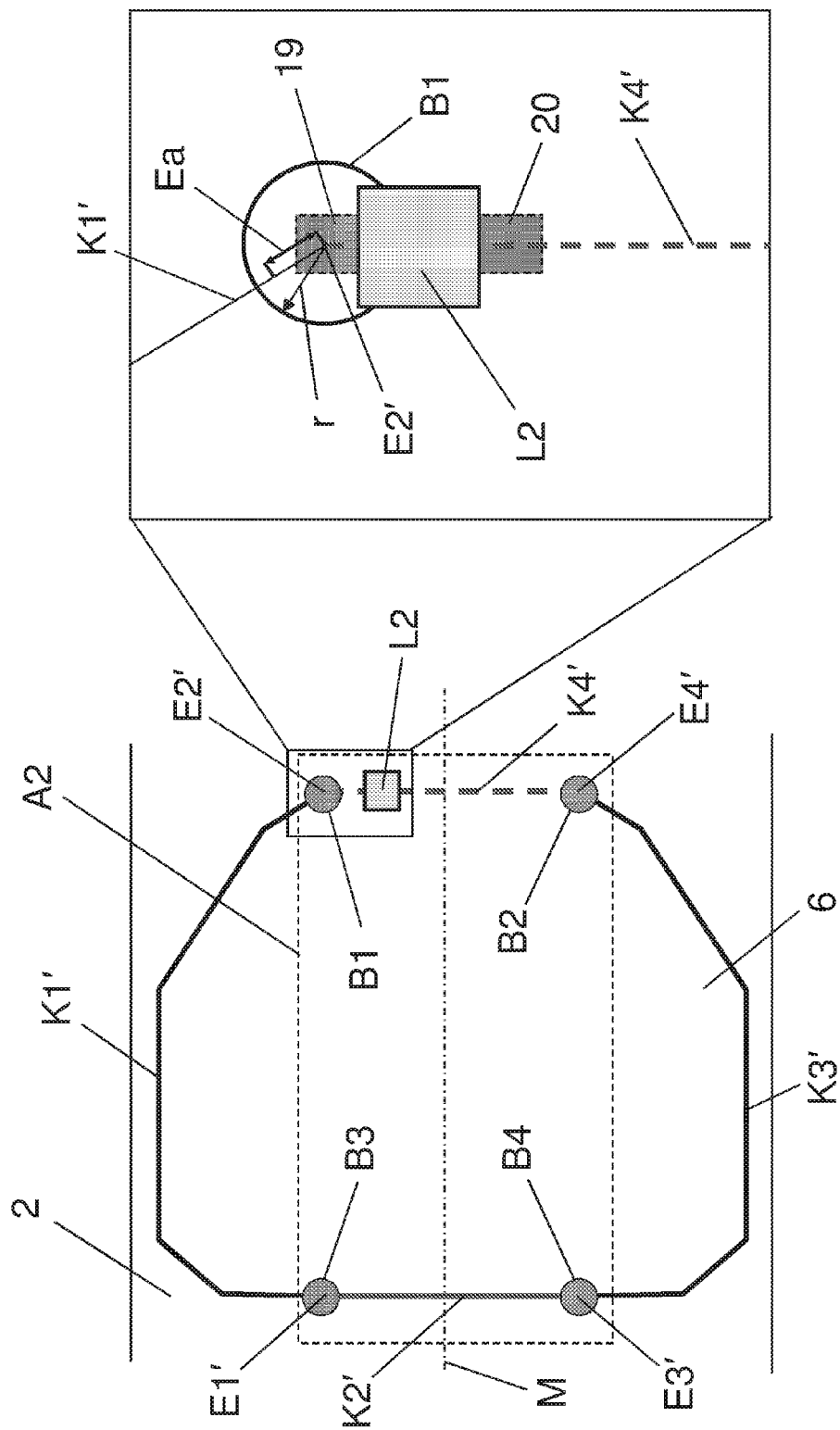
FIG. 6 a schematic representation of the detection of the end point by means of a second laser cutting head.

FIG. 6 schematically shows the situation when the second end point E2 enters the second working range A2. The second end point E2 is designated with E2' in the second working range A2. The second laser cutting head L2 has a first camera 19 and a second camera 20 mounted on it. The first camera 19 and the second camera 20 are each designed so that at least the surface of a transitional area B1, B2, B3, B4 can be observed with them. An observation radius r of the first camera 19 or the second camera 20 is at least 20 mm, preferably 25 to 50 mm. Here a current cutting area of the second laser cutting head L2 lies outside the observation radius r.

As soon as the second end point E2' has entered the second working range A2, the second laser cutting head L2 is moved into the first transitional area B1. The first camera 19 detects the second end point E2', which is located at the end of an end section—designated with the reference letter Ea—of the first partial contour cut K1'. On the basis of the picture provided by the first camera 19 and the known coordinates of the second laser cutting head L2, the controller can calculate, taking into consideration the speed at which the sheet metal band 2 is moving in the transport direction x, a movement for the second laser cutting head L2 to make it line up with the end section Ea, so that the subsequently produced second laser beam (not shown) reaches exactly into the end section Ea, and then makes the fourth partial contour cut K4'.

At the end of the fourth partial contour cut K4', the second camera 20 detects the fourth end point E4' in a second transitional area B2. The controller can control the movement of the second laser cutting head L2 in such a way that the fourth partial contour cut K4' ends exactly at the fourth end E4'. While the fourth partial contour cut K4' is being made, the second laser cutting head L2 is concurrently moved along with sheet metal band 2 in the x direction and reaches the downstream end of the second working range A2. As soon as the fourth partial contour cut K4 has been completed, the second laser cutting head L2 is moved back in the direction of the first transitional area B1, to make the second partial contour cut K2' connecting to a first end point E1'.

Figure 7:
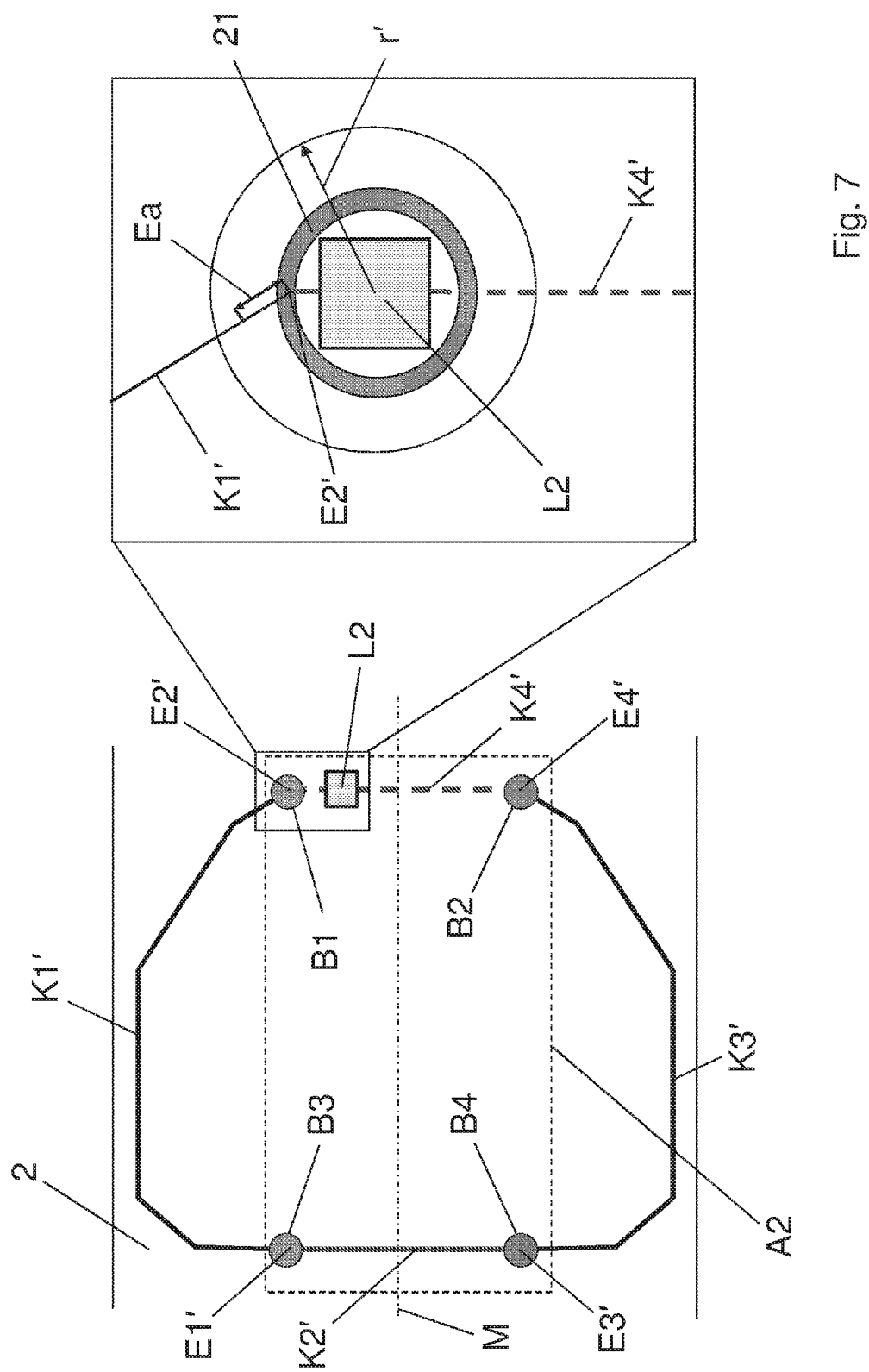
FIG. 7 a schematic representation of the detection of an end point by means of another second laser cutting head.

FIG. 7 shows another example of a method to find an end section Ea of the first partial contour cut K1'. This method involves the second laser cutting head L2 having a third camera 21, which has ring optics. The ring optics concentrically surround a second laser beam (not shown) exiting from the second laser cutting head L2. An observation field of the third camera 21 is concentric with the second laser beam. Another observation radius of the third camera 21 is labeled with reference letter r'.

The use of a third camera 21 with a concentric observation field has the advantage that it can simultaneously detect the end points that are located in the entire area surrounding the second laser cutting head L2.

FIG. 8a-h show the individual steps for producing a second partial contour cut K2. The second laser cutting head L2 shown in FIG. 8a-h has a first light section sensor 22 and a second light section sensor 23, which are arranged opposite one another. Reference letter S1 designates a first expected end point of the second partial contour cut K2, this end point being specified by a cutting program, and reference letter S2 designates a second expected end point. One actual end point of the first partial contour cut K1 is designated with reference number I1 and a second actual end point of the third partial contour cut is designated with reference number I2.

In the first step shown in FIG. 8a, the first partial contour cut K1 and the third partial contour cut K3 have reached the second working range A2. The second laser cutting head L2 is moved along a path specified by the cutting program in the direction of the first expected end point S1.

The second step shown in FIG. 8b involves detecting the first actual end point I1 by the first light section sensor 22. The cutting program then calculates a first corrected path Ba1 that leads to the first actual end point I1.

Figure 8C:
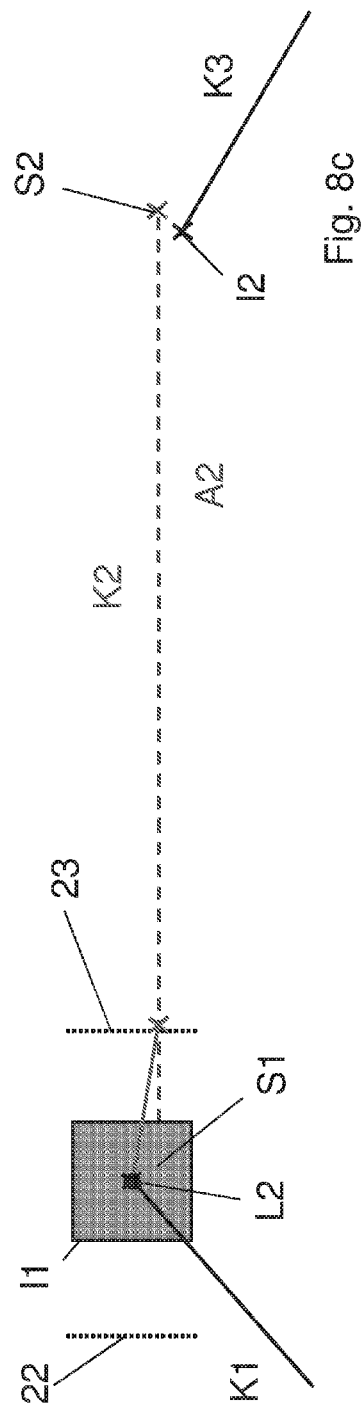

In the third step shown in FIG. 8c, the second laser cutting head L2 lines up with the first actual end point I1. A second corrected path Ba2 is calculated, whose end point lies on the path of the second partial contour cut K2 specified by the cutting program.

Figure 8D:
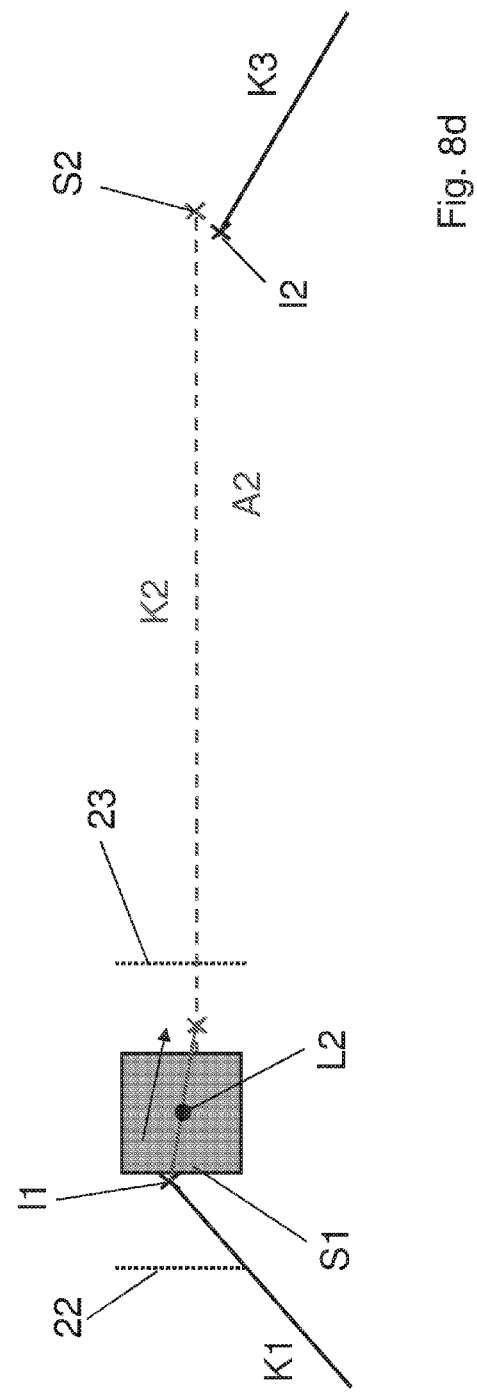

The fourth step shown in FIG. 8d now involves the second laser cutting head L2 beginning the second partial contour cut K2 along the second corrected path Ba2 starting from the first actual end point I1. The second laser cutting head L2 is guided in the direction of the second expected end point S2, first along the second corrected path Ba2.

In the fifth step shown in FIG. 8e, the second laser beam produced by the second laser cutting head L2 has reached the path for the second contour K2 specified by the cutting program. The second laser cutting head L2 is moved farther along the path specified for the second partial contour cut K2 until the second actual end point I2 of the third partial contour cut K3 is detected by the second light section sensor 23 (see FIG. 8f, 8g). At this time, the control program calculates a third corrected path Ba3, which leads to the second actual end point I2.

The second laser cutting head L2 is now guided on the third corrected path Ba3 to the second actual end point I2 (see FIG. 8h).

The proposed method ensures that the first partial contour cut K1 and the third partial contour cut K3 are securely and reliably connected by means of the second partial contour cut K2.

LIST OF REFERENCE NUMBERS

1 Reel
2 Sheet metal band
3 Coil
4 Roller straightening machine
5 Laser cutter
6 Blank
7 Scrap piece
8 First robot
9 Second robot
10 First press
11 Second press
12 Third press
13 Shaped sheet metal part
14 Third robot
15 Fourth robot
16 Fifth robot
17 Furnace
18 Testing device
19 First camera
20 Second camera
21 Third camera
22 First light section sensor
23 Second light section sensor
A1 First working range
A2 Second working range
A3 Third working range
B1 First transitional area
B2 Second transitional area
B3 Third transitional area
B4 Fourth transitional area
Ba1 First corrected path
Ba2 Second corrected path
Ba3 Third corrected path
E1 First end point
E1' Previous first end point
E2 Second end point
E2' Previous second end point
E3 Third end point
E3' Previous third end point
E4 Fourth end point
E4' Previous fourth end point
Ea End section
I1 First actual end point
I2 Second actual end point
K Contour
K1 First partial contour cut
K1' Previous first partial contour cut
K2 Second partial contour cut
K2' Previous second partial contour cut
K3 Third partial contour cut
K3' Previous third partial contour cut
K4' Previous fourth partial contour cut
L1 First laser cutting head
L2 Second laser cutting head
L3 Third laser cutting head
M Midline
S1 First expected end point
S2 Second expected end point
U1 First overlap
U2 Second overlap
x Transport direction

The invention claimed is:

1. A method for producing a shaped sheet metal part, comprising following steps:
   continuously feeding a sheet metal band unwound from a coil to a jet cutter;
   cutting, by means of the jet cutter, a blank out of the sheet metal band moving at a constant speed, time required to cut the blank defining a cycle;
   picking up the blank by means of a first transfer device operating in time with the cycle;
   transferring the blank by means of the first transfer device to a shaping system operating in the time with the cycle; and
   shaping the blank into the shaped sheet metal part by means of the shaping system.

2. The method described in claim 1, further comprising steps of picking up at least one scrap piece shaped by cutting the blank and setting the at least one scrap piece on a first stacking place, by means of a second transfer device.

3. The method described in claim 1, wherein in the step of transferring the blank to the shaping system, the blank is set, by the first transfer device, into a shaping device of the shaping system, or onto a transfer place.

4. The method described in claim 3, further comprising steps of picking up the blank from the transfer place by means of a second transfer device working in the time with the cycle and setting into the shaping device of the shaping system, when the blank is set, by the first transfer device, onto the transfer place.

5. The method described in claim 4, wherein if the jet cutter malfunctions, the blank is picked up, by the first transfer device or the second transfer device, from the transfer place located outside a transport path of the sheet metal band or the blank and transferred to the shaping system.

6. The method described in claim 1, wherein if the shaping system malfunctions, the blank is set, by the first transfer device, onto a second stacking place located outside a transport path of the sheet metal band or the blank.

7. The method described in claim 1, wherein the blank is transferred, by the first transfer device, to a transport device for transport through a furnace.

8. The method described in claim 1, wherein the jet cutter that is used is a laser cutter with at least one laser cutting head that can be moved in a transport direction of the sheet metal band and a direction perpendicular to the transport direction.

9. The method described in claim 1, wherein at least one press, at least one hot shaping press, or a hydroforming device is used as a shaping device.

10. A device to produce a shaped sheet metal part, comprising:
a feeding device for continuously feeding a sheet metal band unwound from a coil;
a jet cutter receiving the sheet metal band from the feeding device to cut a blank out of the sheet metal band moving at a constant speed, time required to cut the blank defining a cycle;
a first transfer device working in time with the cycle to pick up the blank and transfer the blank; and
a shaping system receiving the blank from the first transfer device and working in time with the cycle to shape the blank into the shaped sheet metal part,
wherein the feeding device continuously feeds the sheet metal band unwound from the coil to the jet cutter,
the jet cutter cuts the blank out of the sheet metal band moving at the constant speed,
the first transfer device working in time with the cycle picks the blank and transfers the blank to the shaping system working in time with the cycle, and
the shaping system shapes the blank into the shaped sheet metal part.

11. The device described in claim 10, wherein the feeding device comprises a roller straightening machine.

12. The device described in claim 10, further comprising a second transfer device to pick up a scrap piece formed by cutting the blank and to set the scrap piece on a first stacking place.

13. The device described in claim 10, wherein the blank can be set, by the first transfer device, into a shaping device of the shaping system, or onto a transfer place.

14. The device described in claim 13, further comprising a second transfer device working in the time with the cycle to pick up the blank from the transfer place and set the blank into the shaping device of the shaping system, when the blank is set, by the first transfer device, onto the transfer place.

15. The device described in claim 14, further comprising a controller designed so that if the jet cutter malfunctions, the blank is picked up, by the first transfer device or the second transfer device, from the transfer place located outside a transport path of the sheet metal band or the blank and transferred to the shaping system.

16. The device described in claim 10, further comprising a controller provided so that if the shaping system malfunctions, the blank is set, by the first transfer device, onto a second stacking place located outside a transport path of the sheet metal band or the blank.

17. The device described in claim 10, wherein a furnace and a transport device to transport the blank into the furnace are provided.

18. The device described in claim 10, wherein the jet cutter comprises a laser cutter with at least one laser cutting head that can be moved in a transport direction of the sheet metal band and a direction perpendicular to the transport direction.

* * * * *